Feb. 19, 1963 E. W. WILSON 3,077,716
AIR CLEANER
Filed April 28, 1961 2 Sheets-Sheet 1
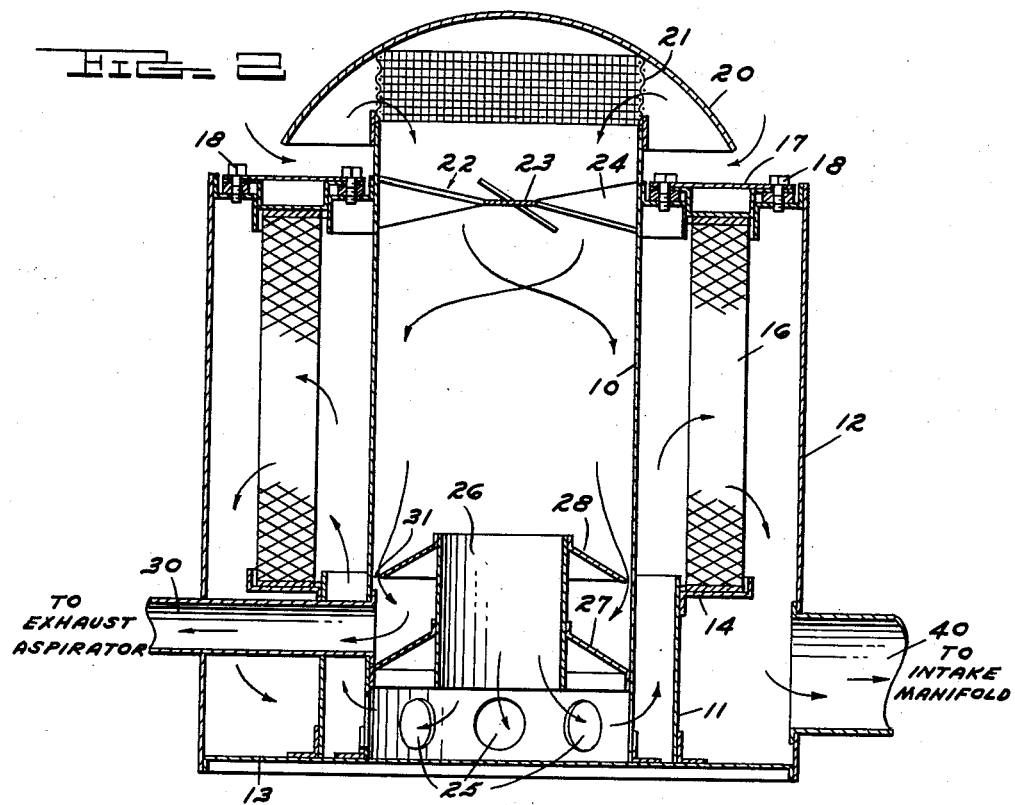
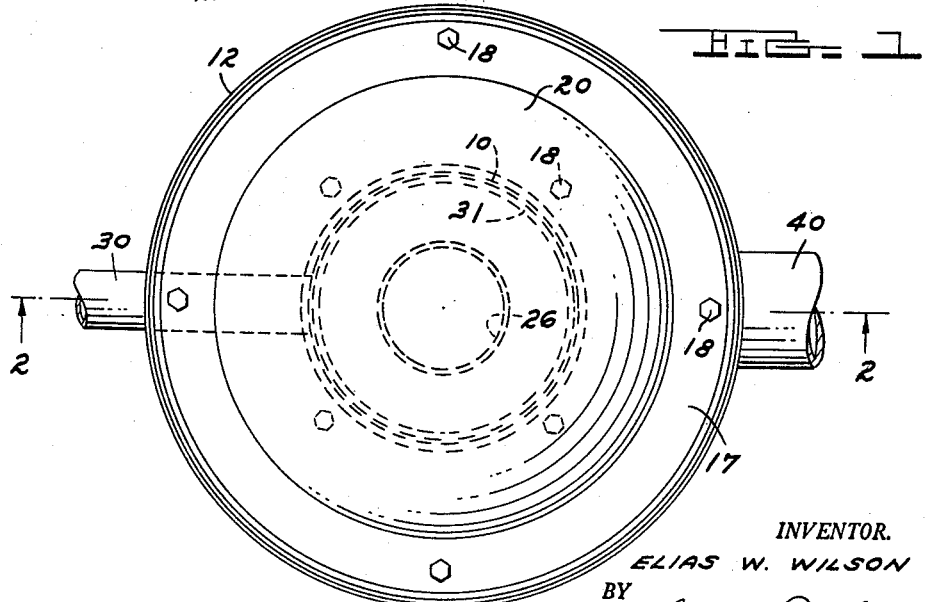
INVENTOR.
ELIAS W. WILSON
BY
ATTORNEY Feb. 19, 1963  E. W. WILSON  3,077,716
AIR CLEANER
Filed April 28, 1961  2 Sheets-Sheet 2
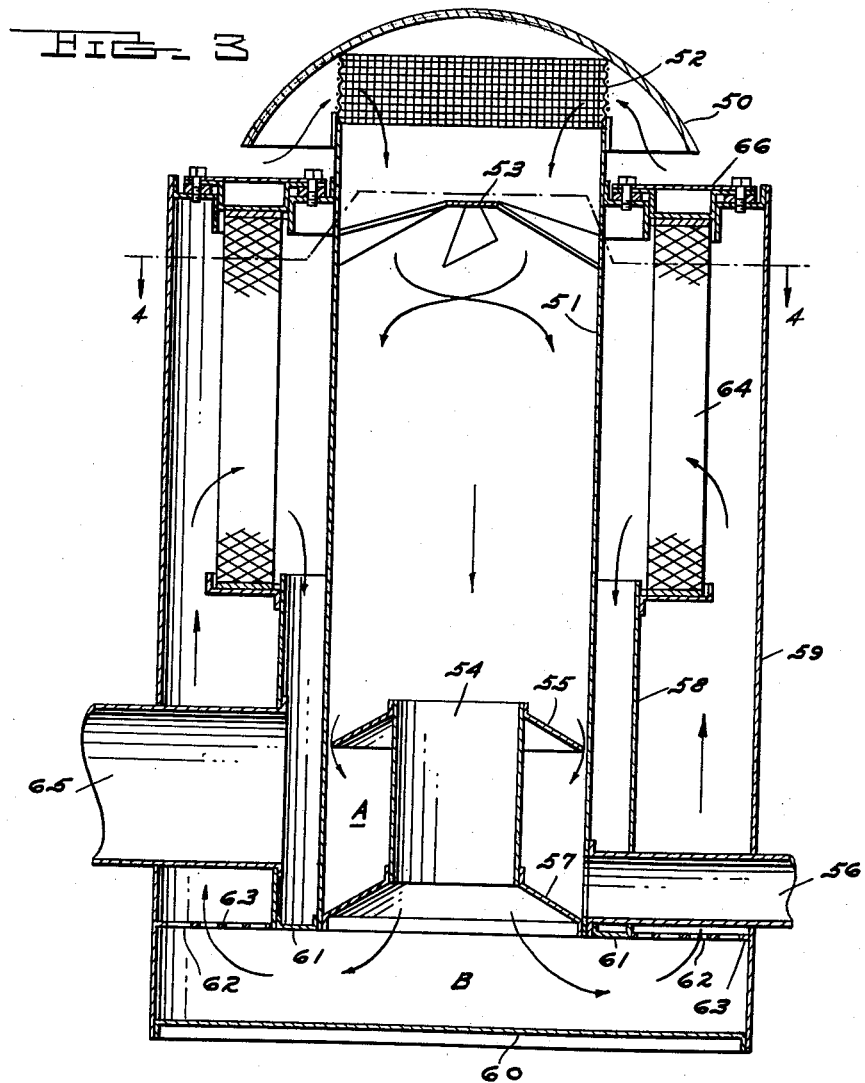
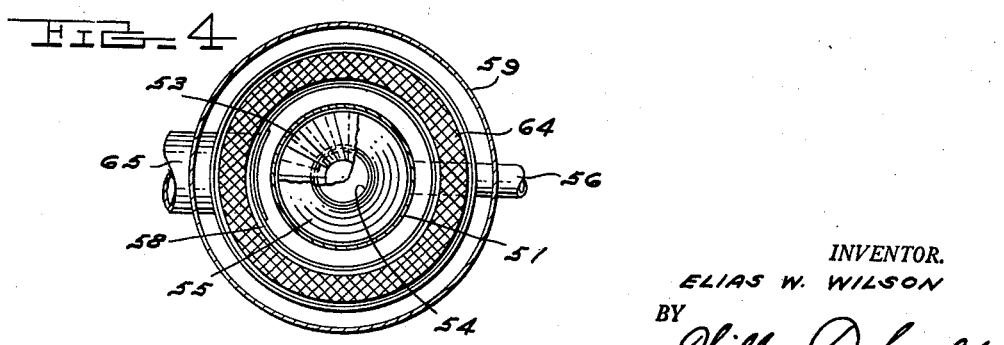
INVENTOR.
ELIAS W. WILSON
BY
ATTORNEY 3,077,716
AIR CLEANER
Elias W. Wilson, 935 E. 3rd St., Royal Oak, Mich.
Filed Apr. 28, 1961, Ser. No. 106,376
6 Claims. (Cl. 55—337)

This invention relates to a high capacity air cleaner particularly suitable for use on internal combustion engines, air compressors and other air using devices.

Air cleaners have been employed heretofore to facilitate supplying clean air to machinery such as internal combustion engines and air compressors, however, the several devices of the prior art have not proven entirely satisfactory inasmuch as they are complicated in design and construction, expensive to manufacture, difficult to use, and are unsatisfactory in operation due to the fact that they do not efficiently clean the air and become clogged with dirt, lint, and other foreign matter.

With the foregoing in view, the primary object of the invention is to provide a high capacity air cleaner which is simple in design and construction, inexpensive to manufacture, easy to use, and which maintains itself in substantially clean condition so as to operate at peak efficiency.

An object of the invention is to provide concentric cylinders defining air chambers and passages with the air traveling downwardly and upwardly several times so as to reverse the flow of air to drop out entrained dirt.

An object of the invention is to provide expansion and reduction chambers concentrically disposed so as to increase and reduce the velocity of the air as it travels radially from chamber to chamber so as to drop out entrained dirt.

An object of the invention is to provide a removable filter as part of the intermediate cylinder.

An object of the invention is to provide a compact device which is easily usable and mountable without occupying too much space.

An object of the invention is to provide a suction pipe communicating with the dirt collection chamber for evacuation of dirt from the chamber to keep the device clean and to keep it at top operating efficiency at all times.

These and other objects of the invention will become apparent by reference to the following description of a high capacity air cleaner embodying the invention taken in connection with the accompanying drawing in which:

FIG. 1 is a top plan view of the device seen in FIG. 2 showing some internal construction in dotted lines.

FIG. 2 is a cross-sectional view of FIG. 1 taken on the line 2—2 thereof.

FIG. 3 is a view similar to FIG. 2 showing a modified device; and

FIG. 4 is a reduced top plan view of the device seen in FIG. 3 with parts broken away for clearer illustration.

Referring now to the drawings wherein like numerals refer to like and corresponding parts throughout the several views, the high capacity air filter disclosed therein to illustrate the invention comprises an inner cylinder 10 disposed concentrically with intermediate cylinder 11 which is, in turn, centrically disposed within the outer cylinder 12 with all the cylinders spaced from one another to form passages and chambers therebetween. The cylinders are supported and interconnected at their bottom ends by the bottom plate 13 which seals off the bottom ends of all the cylinders; the intermediate cylinder 11 is equipped with an annular flange 14 adjacent its upper end which supports the annular air filter 16 in concentric spaced relationship to both the inner cylinder 10 and the outer cylinder 12. The annular top sealing ring 17 surrounds the inner cylinder 10 and contacts the outer cylinder 12 at its outer peripheral edge and in its center area it contacts the annular filter 16 so as to seal off chambers between the elements described. It will be noted that the annular top ring is removable via the bolts 18 and this permits easy inspection and replacement of the filter 16.

More particularly, the cap 20 is removably positioned on the inner cylinder 10 in spaced relationship thereto and the area therebetween is provided with an annular screen 21 for filtering out relatively large airborne foreign particles and it will be noted that air entering the inner cylinder 10 must by-pass the cap 20 so that it travels to the inner cylinder 10 radially thereof. The angularly bladed baffle 22 has a solid center 23 for preventing air traveling or entering in the axial center of the inner cylinder 10 and it is provided with angulated blades 24 which contact the incoming air and spirally whirl it within the cylinder 10 creating a centrifugal force which drives the dirt particles in the air to the radially outer area within the outer cylinder 10 as the air spirals downwardly.

The inner cylinder 10 is provided without outlet apertures 25 adjacent its bottom end and the center tube 26 is spaced above the apertures 25 and concentrically disposed within the inner cylinder 10 and supported and sealed off above the apertures 25 by the flange 27. The baffle flange 28 is connected and supported by the center tube 26 and has a radially outer peripheral edge spaced from the inner cylinder 10 creating a passage-way therebetween leading to the chamber created by the inner tube 26, inner cylinder 10, support flange 27, and flange 28 and it will be noted that the exhaust tube 30 leads from the chamber so created and is adapted to be connected to a vacuum device, such as a venturi aspirator connected to the exhaust pipe of an internal combustion engine, to create a suction in the tube 30 so that dirt in the chamber is withdrawn. Due to the fact that the dirt exhaust tube 30 creates an air flow demand on the supply of the inner cylinder 10, a drawn circulation of air is created within the inner cylinder 10 adjacent its sidewalls so that the outwardly directed dirt particles entrained in this area are drawn through the passageway 31 and kept clear of the axially centrally disposed intake upper end of the center pipe 26.

It can now be understood that only the cleanest air in the inner cylinder 10 is delivered to the center pipe 26 which delivers it downwardly to the inner cylinder 10 in the area of its outlet apertures 25 whereupon the air travels radially outwardly through the apertures 25 into the intermediate cylinder 11 surrounding the apertured bottom area of the inner cylinder 10 and directs the air upwardly therefrom towards the annular filter 16 through which it travels, being further cleaned thereby, into the outer cylinder 12 and it will be noted that the supply pipe 40 leads off the outer cylinder 12 adjacent the bottom thereof causing a reverse in the air direction as delivered by the intermediate cylinder 11 to the outer cylinder 12.

In operation, the air is drawn through the device by both the exhaust pipe 30 and the supply pipe 40 and it enters the inner cylinder adjacent its radial edge at the top and is swirled and spirally directed by the blades 24 whereupon the heavier dirt travels to the outer area of the inner cylinder 10 and is entrained in the air circulation through the passage 31 to the dirt exhaust pipe 30 and the cleaner air which remains axially centrally disposed in the inner cylinder 10 is drawn into the center tube 26 and delivered through the apertures 25 to the intermediate cylinder 11 and thereby upwardly directed through the annular filter 16 which takes out the lighter than air dirt particles such as lint and fine dust and then delivers the air to the outer cylinder 12 which then conducts the air downwardly to the supply pipe 40 to the intake manifold of the internal combustion engine or the air compressor.

It is to be observed that the volume of air traveling through the center tube 26 is substantially less than the capacity or volume of the intermediate cylinder 11 and, in turn, the cross-sectional area and/or volume of the intermediate cylinder 11 not occupied by the inner cylinder 10 is substantially less than that of the outer cylinder 12 so that the air is expanded as it travels thereby reducing velocity influence and relieving pressure thereby more readily dropping out and filtering out air borne dirt particles. It is also obvious, that under these conditions that the filter 16 is not subjected to dirt driving velocities or pressures and therefore acts more efficiently as a filter and upon it absorbing dirt particles it provides it with a much longer filtering life between cleanings and changes.

Referring now to the device seen in FIGS. 3 and 4, the cap 50 is supported on the inner cylinder 51 in spaced relationship thereto with the space therebetween covered by the screen 52; the centered angularly bladed baffle 53 is disposed adjacent and within the top of the inner cylinder 51 to spirally swirl the air traveling radially into the cylinder 51 so as to develop a centrifugal force to throw the heavier than air partcles sidewise outwardly adjacent the sidewalls of the inner cylinder 51 so that upon their approaching the intake tube 54 the dirt particles are adjacent the sidewalls of the inner cylinder 51 and fall between the baffle 55 and the inner cylinder 51 into the chamber A from whence they are withdrawn by the suction tube 56 which is connected to a vacuum developing device; the tube 54 is supported at its bottom end by the baffle 57 which seals off the space between the tube 54 and the inner cylinder 51 so that the air traveling through the tube 54 enters the chamber B at the bottom of the device.

The intermediate cylinder 58 is disposed concentrically around the inner cylinder 51 in spaced relationship thereto and the outer cylinder 59 is concentrically disposed around the intermediate cylinder 58 in spaced relationship thereto with the wall 60 sealing off the bottom of the outer cylinder 59 and with the wall 61 sealing off the bottom of the intermediate cylinder 58 so that air received in chamber B is directed through the apertures 62 in the connecting and supporting wall 63.

The air then travels upwardly in the area between the outer cylinder 59 and the intermediate cylinder 58 and travels through the annular filter 64 into the space between the filter and the inner cylinder 51 and then downwardly in the area between the intermediate cylinder 58 and the inner cylinder 51 and then vents outwardly to the air using device via the air supply tube 65.

It will be noted in the modified device of FIGS. 3 and 4 that the volume of the outer cylinder 59 is much greater than the volume of either the inner cylinder 51 or tube 54 and that it is also much greater than the area of or volume of the intermediate cylinder 58 so that the air slows up in chamber B and in the outer cylinder 59 area so that the filtering action of the filter 64 is greatly assisted as there is no driving air force projecting dirt particles through the filter 64 thereby permitting the filter 64 to act highly efficiently.

As previously described in conjunction with the device of FIGS. 1 and 2, the device of FIGS. 3 and 4, the cap 50 is removable as is the closure ring 66 so that upon removal of the cap and ring the filter 64 can be removed and cleaned and it also within the prevue of the invention to have the bottom wall 60 removable for dropping out any collected dirt in the bottom of the device.

The devices have proved highly effective in excessively dusty and dirty conditions such as in fields of cotton where excessive dust conditions prevail and wherein the prior art devices have to be cleaned at the end of each row whereas the inventive device operates all day without cleaning of any kind and at a highly efficient rate.

Although but a single embodiment of the invention has been shown and described in detail with one modification, it is obvious that many changes may be made in the size, shape, detail and arrangements of the various elements of the invention within the scope of the appended claims.

I claim:

1. An air cleaner for air consuming devices such as an internal combustion engine, comprising inner, outer, and intermediate cylinders concentrically disposed and radially spaced from one another; all said cylinders having top and bottom ends; a base plate attached to the bottom ends of said cylinders sealing off same; said inner cylinder interiorly defining a down flow air intake chamber; said spaced inner and intermediate cylinders defining therebetween an up-flow air transfer chamber; said spaced intermediate and outer cylinders defining therebetween a down-flow air outlet chamber; top closure means sealing off the area between said inner and outer cylinders over said intermediate cylinder; said intermediate cylinder comprising a solid annular wall adjacent its bottom end and an annular porous filter adjacent its top end; said inner cylinder having apertures adjacent its bottom end communicating with said intermediate cylinder; said intermediate cylinder communicating with said outer cylinder via said porous filter; and an air outlet pipe leading from said outer cylinder adjacent its bottom end; air flowing downwardly in said inner cylinder transferring to said intermediate cylinder via said inner cylinder bottom aperture, air flowing upwardly in said intermediate cylinder transferring to said outer cylinder via said porous filter portion, and air flowing downwardly in said outer cylinder traveling out said outlet pipe; said air in traveling radially outwardly from one said cylinder to the next being expanded so as to easily drop out entrained dirt due to decreasing velocity.

2. In a device as set forth in claim 1, said inner cylinder having a multiple bladed deflector having angularly disposed blades and a solid center disc so as to prevent air directly flowing into the axial center of said inner cylinder and to spirally swirl the air radially outwardly in said cylinder to centrifugally throw heavy dirt particles against the inner cylinder, an axially concentrically disposed tube adjacent the apertures of said inner cylinder bottom end; and flange means sealing between said tube and said inner cylinder so that only axially center air is emitted from said inner cylinder through said tube to said apertures leading to said intermediate cylinder.

3. An air cleaner particularly suitable for internal combustion engines comprising an inner cylinder having an upper end constituting an air intake, a cap supported in spaced relationship on said inner cylinder upper end, a screen disposed between said cap and said inner cylinder upper end, an annular bladed deflector disposed in said inner cylinder adjacent its upper end having multiple angularly disposed blades adapted to impart a spiral swirl to incoming air so as to throw heavy dirt particles radially outwardly against said inner cylinder via centrifugal force thereby substantially eliminating heavy dirt particles in the air axially centrally traveling in said inner cylinder; said inner cylinder having a bottom and; a tube axially centrally concentrically located in said inner cylinder spaced above its bottom end adapted to take air from said inner cylinder in the dirt free axially center area thereof; said tube having a top and a bottom end; means sealing the area between said inner cylinder and said tube adjacent said tube bottom end; a flange on said tube adjacent its top end spaced slightly from said inner cylinder; the annular area between said flange, sealing means, tube, and inner cylinder constituting a dirt accumulation chamber communicating with said inner cylinder via the space between said flange and said inner cylinder so as to receive dirt there through into said dirt chamber; a vacuum pipe communicating with said dirt chamber adapted to be connected to an exhaust pipe venturi for clearing the dirt out of said dirt chamber and for drawing dirt thereinto past said flange; an intermediate cylinder concentrically surrounding said inner cylinder at its bottom end; said inner cylinder having apertures adjacent its bottom end communicating to the interior of said intermediate cylinder; said intermediate cylinder having top and bottom ends; an annular flange on said intermediate cylinder upper end, an annular air filter element concentrically surrounding said inner cylinder resting on said intermediate cylinder upper end flange, an outer cylinder concentrically disposed around said intermediate cylinder and annular filter; said outer cylinder having top and bottom ends; a base plate sealing off the bottom ends of all said cylinders, a ring-like top plate sealing between said inner and outer cylinders and said annular filter; said cap and top plate being removable for removing said filter; and a clean air pipe leading from said outer cylinder to the intake manifold of an internal combustion engine.

4. An air cleaner for air consuming devices such as an internal combustion engine, comprising inner, outer, and intermediate cylinders concentrically disposed and radially spaced from one another; all said cylinders having top and bottom ends; a base plate attached to the bottom ends of said cylinders sealing off same; said inner cylinder interiorly defining a down flow air intake chamber; said spaced inner and intermediate cylinders defining therebetween an up-flow air transfer chamber; said spaced intermediate and outer cylinders defining therebetween a down-flow air outlet chamber; top closure means sealing off the area between said inner and outer cylinders over said intermediate cylinder; said intermediate cylinder comprising a solid annular wall adjacent its bottom end and an annular porous filter adjacent its top end; said inner cylinder having apertures adjacent its bottom end communicating with said intermediate cylinder; said intermediate cylinder communicating with said outer cylinder via said porous filter; an air outlet pipe leading from said outer cylinder adjacent its bottom end; air flowing downwardly in said inner cylinder transferring to said intermediate cylinder via said inner cylinder bottom aperture, air flowing upwardly in said intermediate cylinder transferring to said outer cylinder via said porous filter portion, and air flowing downwardly in said outer cylinder traveling out said outlet pipe; said air in traveling radially outwardly from one said cylinder to the next being expanded so as to easily drop out entrained dirt due to decreasing velocity; said inner cylinder having a multiple bladed deflector having angularly disposed blades and a solid center disc so as to prevent air directly flowing into the axial center of said inner cylinder and to spirally swirl the air radially outwardly in said inner cylinder to centrifugally throw heavy dirt particles against the inner cylinder, an axially concentrically disposed tube adjacent the apertures of said inner cylinder bottom end; flange means sealing between said tube and said inner cylinder so that only axially center air is emitted from said inner cylinder through said tube to said apertures leading to said intermediate cylinder; an annular flange on said tube spaced above said flange sealing means and spaced slightly from said inner cylinder so that radially outer dirt particles pass therebetween and a vacuum pipe leading through said inner cylinder for evacuating the dirt collected in the area between said inner cylinder and said tube and between said flange sealing means and said spaced flange; said vacuum pipe also drawing air and dirt from the radially outer area of said inner cylinder to create radially outer circulation therein to entrain radially outwardly centrifugally thrown dirt and lead it past said spaced flange to said vacuum pipe.

5. An air cleaner for internal combustion engines comprising spaced concentric intermediate, inner, and outer cylinders all having top and bottom ends, a bottom plate closing off the bottom end of said outer cylinder; said inner cylinder having an open top end constituting a down flow air intake and a bottom end spaced above said bottom plate constituting an air outlet to said outer cylinder; said intermediate cylinder being relatively short and closed at its bottom end and terminating upwardly in an annular flange; an annular air filter seated on said intermediate cylinder annular flange; an annular sealing ring removably surrounding and contacting said inner cylinder, said filter, and said outer cylinder in sealing relationship; said filter permitting air delivery from said outer cylinder to said intermediate cylinder, an air outlet pipe leading from said intermediate cylinder adjacent its bottom end for transmitting cleaned air to use; said device traveling air downwardly in said inner cylinder, upwardly in said outer cylinder, and downwardly in said intermediate cylinder so as to reverse air direction to drop out entrained dirt; a center tube axially concentrically disposed in said inner cylinder having a bottom end spaced above said bottom plate; a support flange sealing between said inner cylinder and said center tube adjacent its bottom end; said center tube having a top end spaced upwardly from its bottom end; an annular dirt exhaust flange surrounding said center tube spaced upwardly from said support flange having a radially outer peripheral edge spaced from said inner cylinder providing an annular dirt passage therebetween; said support flange, dirt exhaust flange, center tube, and inner cylinder creating a dirt exhaust chamber; and an exhaust pipe communicating with said dirt exhaust chamber adapted to lead to a suction device for exhausting dirt from said dirt chamber and for creating air circulation through said dirt passage to draw radially outer air from said inner cylinder above said center tube to evacuate radially outer dirty air from said inner cylinder.

6. In a device as set forth in claim 5, an angularly bladed baffle having a solid center disposed in said inner cylinder adjacent its top end adapted to prevent air flowing into the axial center of said inner cylinder and to spirally swirl the air entering to throw dirt particles radially outwardly in said inner cylinder toward said dirt passage and chamber thereby creating axially center clean air for delivery to said center tube top end, and a cap over said inner cylinder top end precluding axial entry of air thereto so that air enters said inner cylinder radially so as to pass over said angularly bladed baffle to augment centrifugal swirling of the air in said inner cylinder.

References Cited in the file of this patent
UNITED STATES PATENTS 2,467,408    Semon _____ Apr. 19, 1949

FOREIGN PATENTS 140,720    Australia _____ Apr. 9, 1951
160,100    Great Britain _____ Mar. 17, 1921